US011630914B2

(12) United States Patent
Nakajima

(10) Patent No.: US 11,630,914 B2
(45) Date of Patent: Apr. 18, 2023

(54) INFORMATION MANAGEMENT SYSTEM AND INFORMATION MANAGEMENT METHOD

(71) Applicant: HONDA MOTOR CO., LTD., Tokyo (JP)

(72) Inventor: Kei Nakajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 17/142,527

(22) Filed: Jan. 6, 2021

(65) Prior Publication Data
US 2021/0224418 A1 Jul. 22, 2021

(30) Foreign Application Priority Data

Jan. 17, 2020 (JP) .............................. JP2020-005919

(51) Int. Cl.
*G06F 21/62* (2013.01)
*H04L 9/08* (2006.01)
(Continued)

(52) U.S. Cl.
CPC ...... *G06F 21/6245* (2013.01); *G06F 16/2379* (2019.01); *H04L 9/0819* (2013.01); *G06F 2221/2137* (2013.01); *H04L 9/50* (2022.05)

(58) Field of Classification Search
CPC ...... G06F 21/60; G06F 21/62; G06F 21/6209; G06F 21/6218; G06F 21/6227;
(Continued)

(56) References Cited

U.S. PATENT DOCUMENTS

| 8,782,086 B2 * | 7/2014 | Resch ...................... H04L 63/10 |
| | | 711/163 |
| 2008/0177569 A1 * | 7/2008 | Chen ...................... G16H 10/60 |
| | | 370/328 |

(Continued)

FOREIGN PATENT DOCUMENTS

| JP | 2002-269295 | 9/2002 |
| JP | 2003-016168 | 1/2003 |

(Continued)

OTHER PUBLICATIONS

Japanese Office Action dated Nov. 9, 2021, English abstract included, 9 pages.

*Primary Examiner* — Malcolm Cribbs
(74) *Attorney, Agent, or Firm* — Rankin, Hill & Clark LLP

(57) ABSTRACT

In an information management system that manages encrypted personal information on a user stored in a storage device, a personal information appropriateness/inappropriateness determination section determines whether or not the personal information stored in the storage device is appropriate when access permission information is received from a user terminal used by the user, the access permission information instructing that a requesting entity requesting the personal information be permitted to access the personal information. A personal information access management section enables the requesting entity to access the personal information stored in the storage device when it is determined by the personal information appropriateness/inappropriateness determination section that the personal information stored in the storage device is appropriate.

6 Claims, 5 Drawing Sheets

(51) Int. Cl.
*G06F 16/23* (2019.01)
*H04L 9/00* (2022.01)

(58) Field of Classification Search
CPC ............ G06F 21/6245; G06F 21/6254; G06F 16/2379; G06F 2221/2137; H04L 63/10; H04L 9/0819; H04L 9/50; H04W 12/02
See application file for complete search history.

(56) References Cited

U.S. PATENT DOCUMENTS

| | | | |
|---|---|---|---|
| 2017/0068784 A1* | 3/2017 | Sullivan | G16H 10/60 |
| 2020/0043000 A1* | 2/2020 | Unagami | H04W 12/06 |
| 2021/0099313 A1* | 4/2021 | Kondrashov | H04L 67/5683 |
| 2021/0264052 A1* | 8/2021 | Magerkurth | G06Q 20/4014 |

FOREIGN PATENT DOCUMENTS

| | | |
|---|---|---|
| JP | 2003-264540 | 9/2003 |
| JP | 2019-159773 | 9/2019 |

* cited by examiner

FIG.2

[USER REGISTRATION INFORMATION]

| USER ID : UID-001 | | VERSION 2, REFRESH TOKEN 90 | |
|---|---|---|---|
| LEVEL OF DISCLOSURE | PRIVATE KEY | PUBLIC KEY | ENCRYPTED PERSONAL INFORMATION |
| LEVEL 1 | FIRST PRIVATE KEY | FIRST PUBLIC KEY | FIRST PERSONAL INFORMATION |
| LEVEL 2 | SECOND PRIVATE KEY | SECOND PUBLIC KEY | SECOND PERSONAL INFORMATION |
| LEVEL 3 | THIRD PRIVATE KEY | THIRD PUBLIC KEY | THIRD PERSONAL INFORMATION |
| ⋮ | ⋮ | ⋮ | ⋮ |

FIG.3

[USER MANAGEMENT INFORMATION]

| USER ID: UID-001 | | PERSONAL INFORMATION: VERSION 2 | |
|---|---|---|---|
| LEVEL OF DISCLOSURE | PERSONAL INFORMATION | PUBLIC KEY | DISCLOSURE DESTINATION OF PERSONAL INFORMATION |
| LEVEL 1 | FIRST PERSONAL INFORMATION, UPDATE HISTORY | FIRST PUBLIC KEY | ENTERPRISE A: ID, DISCLOSURE HISTORY, RESTRICTION TOKEN FOR PUBLIC KEY, ... OF ENTERPRISE A ENTERPRISE B: ID, DISCLOSURE HISTORY, RESTRICTION TOKEN FOR PUBLIC KEY, ... OF ENTERPRISE B |
| LEVEL 2 | SECOND PERSONAL INFORMATION, UPDATE HISTORY | SECOND PUBLIC KEY | ENTERPRISE C: ID, DISCLOSURE HISTORY, RESTRICTION TOKEN FOR PUBLIC KEY, ... OF ENTERPRISE C |
| LEVEL 3 | THIRD PERSONAL INFORMATION, UPDATE HISTORY | THIRD PUBLIC KEY | ENTERPRISE D: ID, DISCLOSURE HISTORY, RESTRICTION TOKEN FOR PUBLIC KEY, ... OF ENTERPRISE D |
| ... | ... | ... | ... |

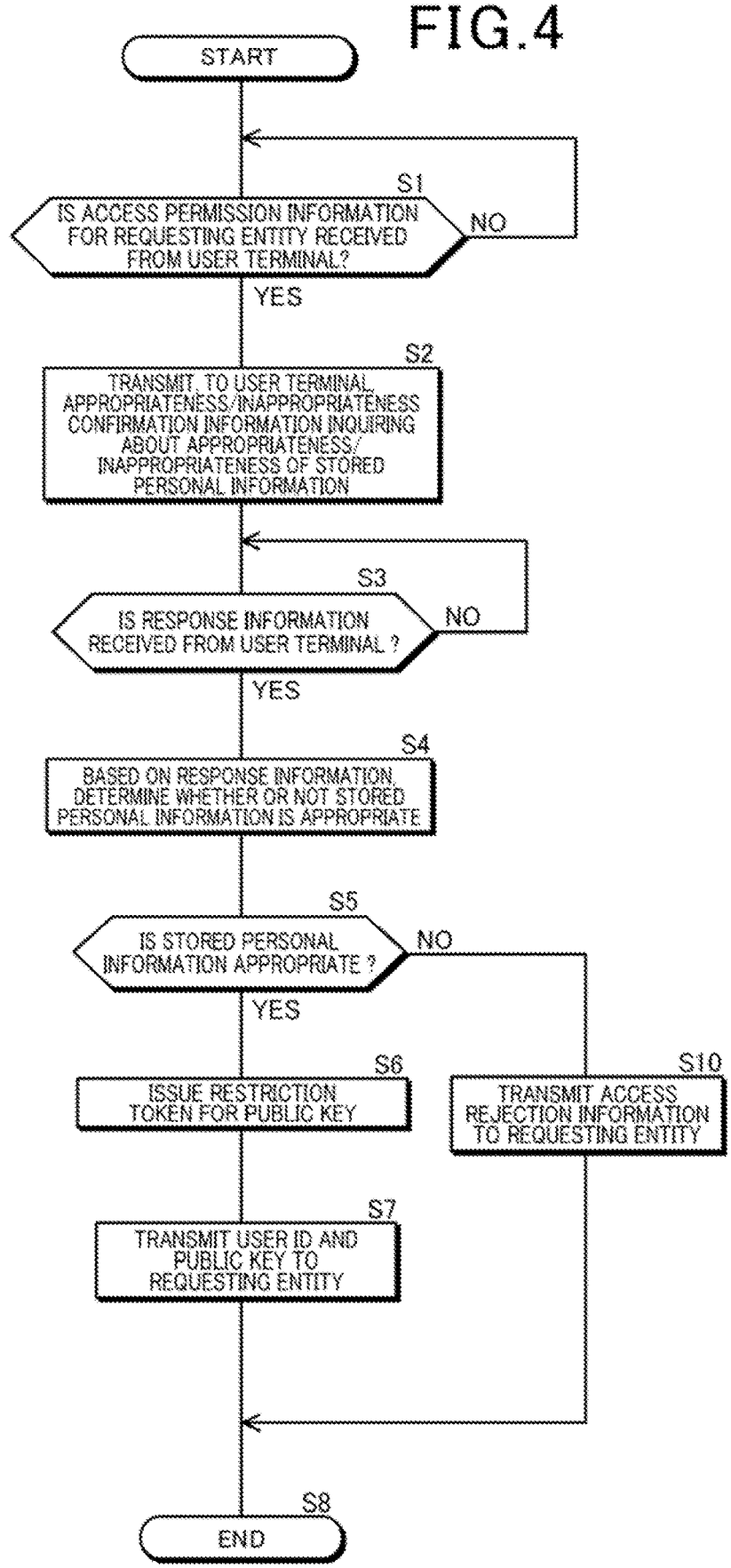

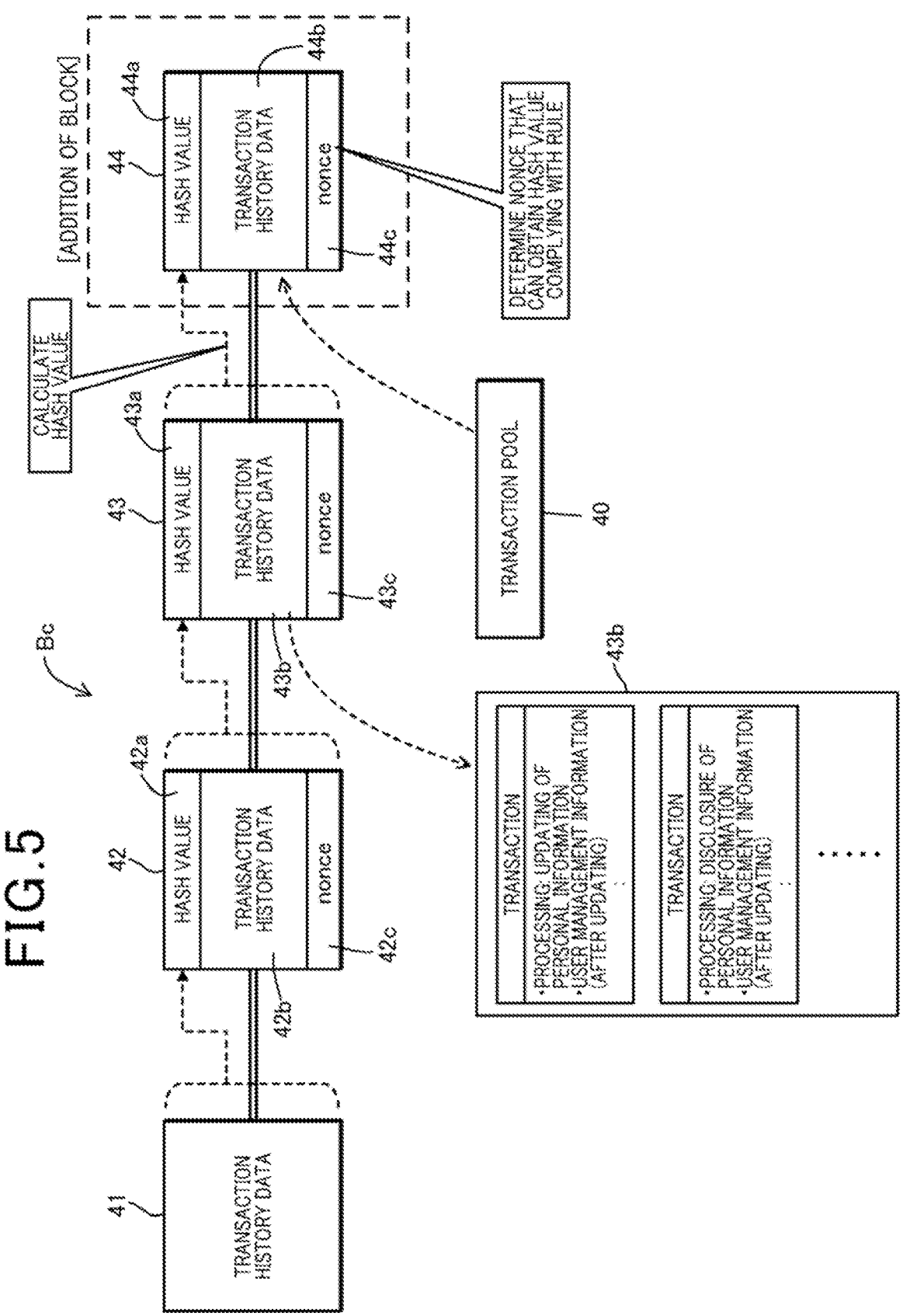

INFORMATION MANAGEMENT SYSTEM AND INFORMATION MANAGEMENT METHOD

INCORPORATION BY REFERENCE

The present application claims priority under 35 U.S.C. § 119 to Japanese Patent Application No. 2020-005919 filed on Jan. 17, 2020. The content of the application is incorporated herein by reference in its entirety.

BACKGROUND OF THE INVENTION

Field of the Invention

The present invention relates to an information management system and an information management method.

Description of the Related Art

Conventionally, a configuration has been proposed in which when a user who has registered census registration information, which is personal information, conducts formalities of changing the census registration information by accessing a census registration information management server, the changed information is transmitted to a personal information management server of a pre-registered organization (for example, see Japanese Patent Application Laid-Open No. 2002-269295).

The census registration information management server according to Japanese Patent Application Laid-Open No. 2002-269295 holds a public key of the organization and, when census registration information is changed, encrypts the updated information by using the public key of the organization and transmits the encrypted updated information to the personal information management server.

The above-described census registration information management server transmits the updated information to the personal information management server of the organization when the formalities of changing the census registration information are conducted by the user. Accordingly, when the user neglects to conduct the formalities of changing the personal information despite the personal information being changed, it is feared that the inappropriate personal information that is different from an actual state of things may continue to be used.

The present invention has been made in view of such a background, and an object of the present invention is to provide an information management system and an information management method that can prevent inappropriate personal information from being used.

SUMMARY OF THE INVENTION

A first aspect to achieve the above object is an information management system that manages encrypted personal information on a user stored in a storage device, including: a personal information appropriateness/inappropriateness determination section that determines whether or not the personal information stored in the storage device is appropriate when access permission information is received from a user terminal used by the user, the access permission information instructing that a requesting entity requesting the personal information be permitted to access the personal information; and a personal information access management section that enables the requesting entity to access the personal information stored in the storage device when it is determined by the personal information appropriateness/inappropriateness determination section that the personal information stored in the storage device is appropriate.

In the information management system, the personal information access management section may be configured to enable the requesting entity to access the personal information stored in the storage device, by transmitting a decryption key for decrypting the encrypted personal information to a requesting entity terminal used by the requesting entity.

The information management system may further include a decryption key usage management section that issues a token for using the decryption key and manages, by using a blockchain, the number of usages of the decryption key through the token.

In the information management system, the personal information appropriateness/inappropriateness determination section may be configured to transmit, to the user terminal, appropriateness/inappropriateness confirmation information inquiring about appropriateness/inappropriateness of the personal information stored in the storage device, and to determine that the personal information stored in the storage device is appropriate when response information notifying that the personal information stored in the storage device is appropriate is received, the response information being transmitted from the user terminal in response to receipt of the appropriateness/inappropriateness confirmation information.

In the information management system, the personal information appropriateness/inappropriateness determination section may be configured to determine that the personal information stored in the storage device is appropriate when a time period that has passed since the personal information was stored into the storage device is equal to or shorter than a predetermined time period.

The information management system may further include an access permission history management section that manages, by using a blockchain, a history of access enabled by the personal information access management section, the access being of the requesting entity to the personal information stored in the storage device.

A second aspect to achieve the above object is an information management method performed by an information management system that manages encrypted personal information on a user stored in a storage device, including: a personal information appropriateness/inappropriateness determination step of determining whether or not the personal information stored in the storage device is appropriate when access permission information is received from a user terminal used by the user, the access permission information instructing that a requesting entity requesting the personal information be permitted to access the personal information; and a personal information access management step of enabling the requesting entity to access the personal information stored in the storage device when it is determined in the personal information appropriateness/inappropriateness determination step that the personal information stored in the storage device is appropriate.

According to the information management system as described above, when the access permission information is received from the user terminal, the personal information appropriateness/inappropriateness determination section determines whether or not the personal information stored in the storage device is appropriate. When it is determined by the personal information appropriateness/inappropriateness determination section that the personal information stored in the storage device is appropriate, the personal information access management section enables the requesting entity to access the personal information stored in the storage device. Thus, a scenario can be prevented in which a requesting entity is enabled to access inappropriate personal information stored in the storage device and consequently the inappropriate personal information is used.

BRIEF DESCRIPTION OF THE DRAWINGS

FIG. 2 is an explanatory diagram of user registration information;

FIG. 3 is an explanatory diagram of user management information;

FIG. 4 is a flowchart of access management processing for personal information by the information management system; and FIG. 5 is an explanatory diagram of an aspect in which the user management information is managed by using a blockchain.

DETAILED DESCRIPTION OF THE PREFERRED EMBODIMENTS

1. Configuration of Information Management System

Figure 1:
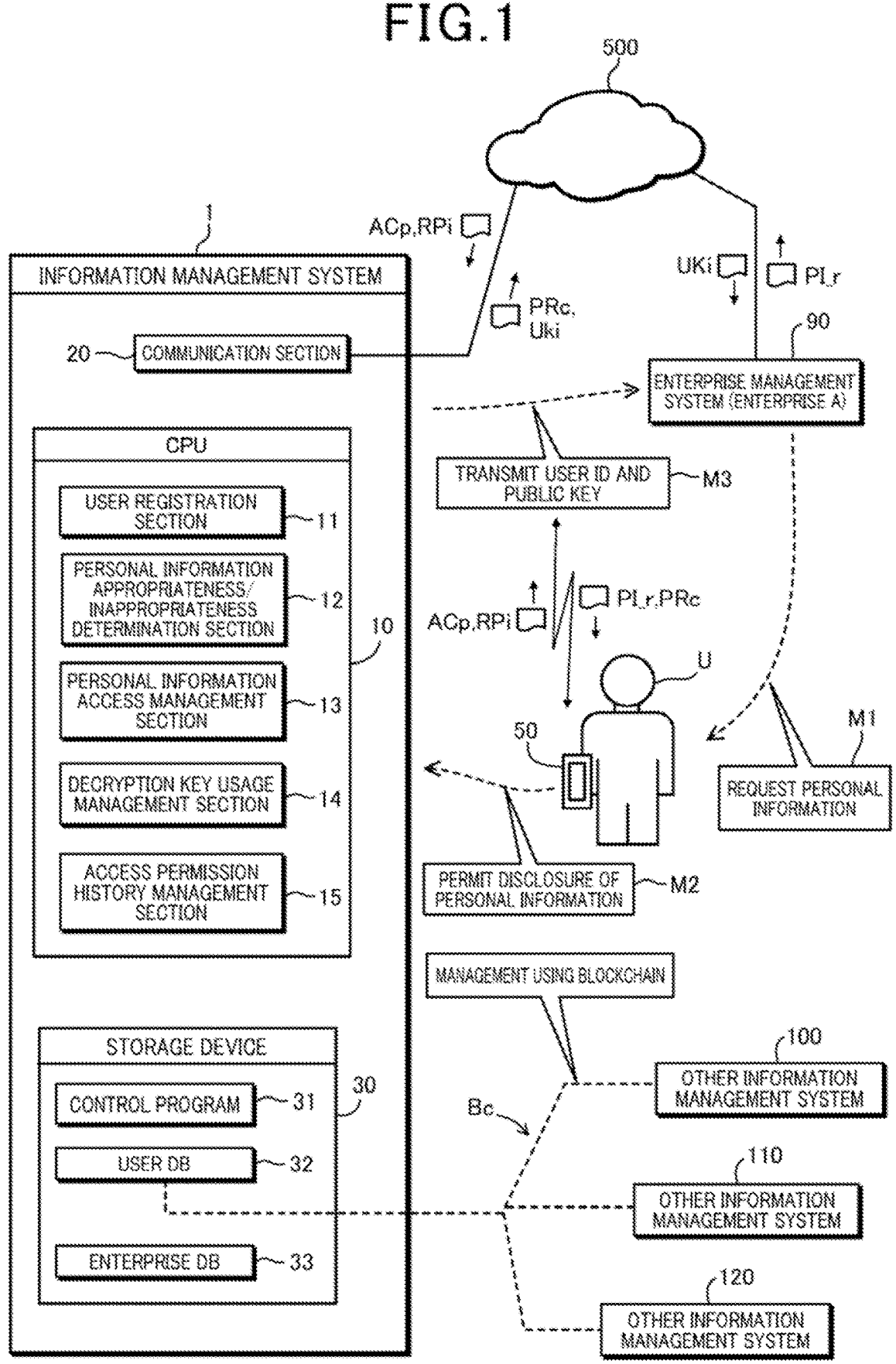
FIG. 1 is an explanatory diagram of a configuration of an information management system.

A configuration of an information management system 1 according to an embodiment will be described with reference to FIG. 1. The information management system 1 is a computer system including a CPU (Central Processing Unit) 10, a communication section 20, a storage device 30, and the like.

The storage device 30 stores a control program 31 for controlling the information management system 1, a user DB (database) 32, and an enterprise DB 33. The user DB 32 stores personal information (name, birthdate, gender, family composition, address, place of work, telephone number, telecommunication address, and the like) on a user registered with the information management system 1, in association with a user ID issued to the user. The personal information on the user is encrypted by using a private key of the user. The enterprise DB 33 stores information (enterprise name, location, telephone number, telecommunication address, and the like) on an enterprise registered with the information management system 1, in association with an enterprise ID issued to the enterprise.

The communication section 20 is an interface circuit for communicating with an external communication terminal through a communication network 500. FIG. 1 illustrates a user U as the user registered with the information management system 1, and illustrates an enterprise management system 90 used at an enterprise A registered with the information management system 1. The information management system 1 communicates with a user terminal 50 used by the user U and with the enterprise management system 90, by using the communication section 20. Hereinafter, a configuration of the information management system 1 will be described, taking processing performed with the user terminal 50 and the enterprise management system 90 as an example.

When the enterprise A desires to acquire the personal information on the user U, the enterprise A requests the personal information from the user U, as shown at M1. When the user U permits disclosure of the personal information to the enterprise A, the user U permits the information management system 1 to disclose the personal information to the enterprise A, as shown at M2. The information management system 1 enables the enterprise A to access the personal information on the user U, by transmitting the user ID of the user U and a public key of the user U for decrypting the encrypted personal information on the user U to the enterprise management system 90, as shown at M3. The information management system 1 performs processing that supports such procedures of M1 to M3.

The CPU 10 functions as a user registration section 11, a personal information appropriateness/inappropriateness determination section 12, a personal information access management section 13, a decryption key usage management section 14, and an access permission history management section 15, by reading and executing the control program 31 stored in the storage device 30. Processing performed by the personal information appropriateness/inappropriateness determination section 12 corresponds to a personal information appropriateness/inappropriateness determination step in an information management method of the present invention. Processing performed by the personal information access management section 13 corresponds to a personal information access management step in the information management method of the present invention.

The user registration section 11 performs processing of registering the user U with the information management system 1, based on registration application information on the user U transmitted from the user terminal 50. The user registration section 11 stores the user U in the information management system 1, by issuing the user TD to the user U and storing the personal information on the user U included in the registration application information into the user DB 32 in association with the user ID.

The user U performs user registration with the information management system 1, updating of the personal information stored in the information management system 1, and the like, by operating an app (application program) for personal information management that is executed by the user terminal 50. The user U creates private keys and public keys that are made to correspond to levels of disclosure of personal information, respectively, as shown in user registration information in FIG. 2, by operating the app for personal information management.

The levels of disclosure of personal information are set, for example, as follows.

Level 1: Disclose the name and address of a user.
Level 2: Disclose the name, address, and telephone number of a user.
Level 3: Disclose the name, address, telephone number, and e-mail address of a user.

As shown in FIG. 2, a private key, a public key, and personal information at each level of disclosure are recorded in the user registration information. For example, a first private key, a first public key, and first personal information are recorded for the level 1. The user registration information is stored in a memory (not shown) of the user terminal 50. Note that the user registration information may be stored in an external storage device provided to the information management system 1, another management server, or the like, and the personal information may be updated by the user U, by accessing the external storage device from the user terminal 50.

When the user U updates the personal information due to a change of the address or the like, the user U creates a new version of the user registration information including the updated personal information through the app for personal information management, and stores the new version of the user registration information into the memory of the user terminal 50 and also transmits the new version of the user registration information to the information management system 1. The user registration section 11 causes user management information to reflect the new version of the user registration information and stores the user management information shown in FIG. 3 into the user DB 32.

A version (illustrated as "VERSION 2" in FIG. 2) for the user registration information and a remaining value (illustrated as "90" in FIG. 2) of a refresh token provided from the information management system 1 are recorded in the user registration information. When the user U updates the user registration information through the app for personal information management, the user U needs to consume the refresh token. Accordingly, third parties other than the user U, which do not have the refresh token, cannot change the user registration information on the user U stored in the user DB 32.

As shown in FIG. 3, in the user management information, the encrypted personal information, the public key, and a disclosure destination of the personal information (a requesting entity to which disclosure of the personal information is permitted) are recorded for each level of disclosure, in association with the user ID of the user U (here, illustrated as "UID-001") and the version for the user registration information. For example, for a level of disclosure of the level 1, the first personal information, an update history of the first personal information, the first public key, and information on an ID, a disclosure history, and a restriction token for the public key of each of enterprises A, B that are the disclosure destinations of the personal information are recorded. The restriction token will be described later.

The private keys and the public keys of the user U are newly created each time the personal information on the user U is updated, and therefore, to decrypt each version of the encrypted personal information, it is necessary to use a public key corresponding to each identical version. Accordingly, for example, a public key corresponding to an immediately previous version cannot decrypt a newest version of the encrypted personal information.

Here, when the user terminal 50 receives disclosure request information PI_r requesting disclosure of the personal information on the user U from the enterprise management system 90, the user terminal 50 displays information on the enterprise A indicated by the disclosure request information PI_r and asks the user U for an instruction to permit or reject disclosure of the personal information to the enterprise A. When the user U makes an operation for an instruction to permit disclosure of the personal information, the user terminal 50 transmits access permission information ACp to the information management system 1. The access permission information ACp includes the enterprise ID of the enterprise A to which disclosure of the personal information is permitted, the user ID of the user U, and a permitted level of disclosure of the personal information.

When the access permission information ACp, which instructs that disclosure of the personal information on the user U to the enterprise A be permitted, is received from the user terminal 50, the personal information appropriateness/inappropriateness determination section 12 determines whether or not the personal information on the user U stored in the user DB 32 is appropriate. To determine whether or not the personal information on the user U stored in the user DB 32 is appropriate, the personal information appropriateness/inappropriateness determination section 12 transmits, to the user terminal 50, appropriateness/inappropriateness confirmation information PRc inquiring whether or not the personal information on the user U stored in the user DB 32 is appropriate. The user U recognizes the appropriateness/inappropriateness confirmation information PRc displayed on the user terminal 50, and confirms whether or not the newest version of the personal information stored in the user DB 32 is appropriate in light of an actual state of things.

When the user U confirms that the newest version of the personal information is appropriate, the user U makes an operation for authenticating appropriateness of the personal information stored in the user DB 32. In response to the operation, the user terminal 50 transmits, to the information management system 1, response information RPi notifying that the personal information stored in the user DB 32 is appropriate.

When the user U recognizes that the newest version of the personal information stored in the user DB 32 is inappropriate in light of the actual state of things, the user U makes an operation for authenticating inappropriateness of the personal information stored in the user DB 32. In response to the operation, the user terminal 50 transmits, to the information management system 1, response information RPi notifying that the personal information stored in the user DB 32 is inappropriate.

When the response information RPi notifying that the personal information stored in the user DB 32 is appropriate is received from the user terminal 50, the personal information appropriateness/inappropriateness determination section 12 determines that the personal information on the user U stored in the user DB 32 is appropriate.

When it is determined by the personal information appropriateness/inappropriateness determination section 12 that the personal information on the user U stored in the user DB 32 is appropriate, the personal information access management section 13 transmits, to the enterprise management system 90, public key information UKi including the user ID of the user U and a public key of the user U corresponding to the level of disclosure specified by the access permission information ACp. Thus, the enterprise management system 90 can decrypt, by using the public key of the user U, and recognize the encrypted personal information on the user U that is acquired from the information management system 1 by specifying the user TD of the user U.

The decryption key usage management section 14 issues a restriction token for restricting the number of usages of a public key that is a decryption key for decrypting the personal information on the user U encrypted by using a private key. The enterprise management system 90 uses the public key by consuming the restriction token. The decryption key usage management section 14 manages a remaining quantity of the restriction token and, when the remaining quantity of the restriction token becomes null, disables use of the public key. The restriction token is managed by being recorded in the user management information as shown in FIG. 3.

The access permission history management section 15 stores, into the user DB 32, a history of disclosure of the personal information on the user U as a result of the personal information access management section 13 permitting the enterprise management system 90 to access the personal information on the user U. The history of disclosure of the personal information on the user U is recorded in the user management information, in which the personal information on the user U, the public keys, the disclosure destinations of the personal information, and the like are recorded, and is stored into the user DB 32. The history of disclosure of the personal information is managed by being recorded in the user management information as shown in FIG. 3.

2. Access Management Processing for Personal Information

Access management processing for personal information performed by the information management system 1 will be described by following a flowchart shown in FIG. 4.

In step S1, when access permission information ACp for a requesting entity (here, the enterprise A) is received from the user terminal 50, the personal information appropriateness/inappropriateness determination section 12 advances the processing to step S2. In step S2, the personal information appropriateness/inappropriateness determination section 12 transmits, to the user terminal 50, appropriateness/inappropriateness confirmation information PRc inquiring whether or not the personal information on the user U stored in the user DB 32 is appropriate.

In subsequent step S3, when response information RPi transmitted from the user terminal 50 is received, the personal information appropriateness/inappropriateness determination section 12 advances the processing to step S4. In step S4, the personal information appropriateness/inappropriateness determination section 12 determines, based on a content of the response information RPi, whether or not the personal information on the user U stored in the user DB 32 is appropriate, as described above. The personal information appropriateness/inappropriateness determination section 12 advances the processing to step S6 when it is determined that the personal information on the user U stored in the user DB 32 is appropriate, and advances the processing to step S10 when it is determined that the personal information on the user U stored in the user DB 32 is not appropriate.

In step S6, the personal information access management section 13 issues, to the enterprise A, a restriction token that is required when a public key of the user U is used in subsequent step S7, the personal information access management section 13 transmits the user ID and the public key of the user U to the enterprise management system 90. Thus, the enterprise A, through the enterprise management system 90, can access the information management system 1 and request disclosure of the personal information by specifying the user ID of the user U. Then, the enterprise A decrypts the encrypted personal information on the user U by using the public key by consuming the restriction token, and thus can recognize the personal information.

In step S10, the personal information access management section 13 transmits, to the enterprise management system 90, access rejection information notifying the enterprise management system 90 that the request for disclosure is not accepted because the personal information on the user U stored in the user DB 32 is inappropriate. Thus, the inappropriate personal information on the user U is prevented from being provided to the enterprise management system 90.

3. Management of Personal Information

As shown in FIG. 5, the personal information on the user U stored in the user DB 32 is managed along with the other elements (the public keys, the disclosure destinations of the personal information, and the like) in the user management information shown in FIG. 3, in a distributed manner by using a blockchain Bc shared with other information management systems 100, 110, 120. Addition of a new block to the blockchain Bc is performed through consensus processing between the information management system 1 and the other information management systems 100, 110, 120.

A transaction in processing performed with respect to the personal information on the user U is sequentially stored into a transaction pool 40. The processing performed with respect to the personal information on the user U includes updating of the personal information by the user U, permission of disclosure of the personal information on the user U to a requesting entity, disclosure of the personal information on the user U to the requesting entity, and the like. In each transaction, a content of the performed processing and data on each item in the user management information shown in FIG. 3 are recorded. When the personal information is updated, a newest version of the encrypted personal information and public keys after the updating are recorded.

FIG. 5 shows an example including four blocks 41, 42, 43, 44. A block is added each time a predetermined time period has passed. Each of the second and following blocks 42, 43, 44 includes a hash value of the immediately preceding block, transaction history data on a transaction or transactions with respect to the personal information on the user U that are stored in the transaction pool 40 during the predetermined time period, and a nonce determined such as to calculate a hash value satisfying a predetermined rule.

For example, when the block 44 is added, a hash value of total data of a hash value 43a, transaction history data 43b is calculated, and a nonce 43c recorded in the immediately preceding block 43. Further, processing for calculating a hash value of total data of the hash value 44a, current transaction history data 44b transferred from the transaction pool 40, and a nonce 44c is repeated. When a nonce that can obtain a hash value satisfying the predetermined rule is determined, the block 44 in which the determined nonce 44c is recorded is added to the blockchain Bc.

4. Other Embodiments

In the above-described embodiment, the personal information appropriateness/inappropriateness determination section 12 determines whether or not the personal information on the user U stored in the user DB 32 is appropriate, by transmitting the appropriateness/inappropriateness confirmation information PRc to the user terminal 50 and receiving from the user terminal 50 the response information RPi notifying appropriateness/inappropriateness of the personal information. As another embodiment, it can be determined that the personal information on the user U stored in the user DB 32 is appropriate when a time period that has passed since the personal information was updated and stored into the user DB 32 is equal to or shorter than a predetermined time period.

Although the number of usages of a public key is restricted by the decryption key usage management section 14 by using a restriction token in the above-described embodiment, a configuration may be made such that such a restriction is not imposed.

Although a history of access of a requesting entity to the personal information on the user U is managed by using a blockchain in the above-described embodiment, a configuration may be made such that the history of access is managed by the information management system 1 alone.

In the above-described embodiment, for an embodiment that enables a requesting entity to access personal information stored in the storage device 30, the embodiment is illustrated in which a public key for decrypting the encrypted personal information is provided to the requesting entity. As another embodiment, for example, provision of personal information by the information management system 1 may be configured to be performed on condition of input of an authentication code, and access of a requesting entity to the personal information may be enabled by providing a one-time authentication code to the requesting entity.

Note that FIG. 1 is a schematic diagram in which the functional components of the information management system 1 are shown by being sectionalized based on main processing contents, to facilitate understanding of the invention of the present application, and components of the information management system 1 may be configured based on other categories. The processing by each constituent element may be performed by a single hardware unit, or may be performed by a plurality of hardware units. The processing by each constituent element shown in FIG. 4 may be performed by using a single program, or may be performed by using a plurality of programs.

5. Configurations Supported by the Above-Described Embodiments

The above-described embodiments are specific examples of configurations described below.

(First item) An information management system that manages encrypted personal information on a user stored in a storage device, including: a personal information appropriateness/inappropriateness determination section that determines whether or not the personal information stored in the storage device is appropriate when access permission information is received from a user terminal used by the user, the access permission information instructing that a requesting entity requesting the personal information be permitted to access the personal information; and a personal information access management section that enables the requesting entity to access the personal information stored in the storage device when it is determined by the personal information appropriateness/inappropriateness determination section that the personal information stored in the storage device is appropriate.

According to the information management system of the first item, when the access permission information is received from the user terminal, the personal information appropriateness/inappropriateness determination section determines whether or not the personal information stored in the storage device is appropriate. When it is determined by the personal information appropriateness/inappropriateness determination section that the personal information stored in the storage device is appropriate, the personal information access management section enables the requesting entity to access the personal information stored in the storage device. Thus, a scenario can be prevented in which a requesting entity is enabled to access inappropriate personal information stored in the storage device and consequently the inappropriate personal information is used.

(Second item) The information management system set forth in the first item, wherein the personal information access management section enables the requesting entity to access the personal information stored in the storage device, by transmitting a decryption key for decrypting the encrypted personal information to a requesting entity terminal used by the requesting entity.

According to the information management system of the second item, the requesting entity can decrypt, by using the decryption key, and use the encrypted personal information received by using the requesting entity terminal.

(Third item) The information management system set forth in the second item, further including a decryption key usage management section that issues a token for using the decryption key and manages, by using a blockchain, the number of usages of the decryption key through the token.

According to the information management system of the third item, the number of usages of the decryption key can be restricted, while the number of usages of the decryption key through the token is prevented from being falsified through management using the blockchain.

(Fourth item) The information management system set forth in any one of the first to third items, wherein the personal information appropriateness/inappropriateness determination section transmits, to the user terminal, appropriateness/inappropriateness confirmation information inquiring about appropriateness/inappropriateness of the personal information stored in the storage device, and determines that the personal information stored in the storage device is appropriate when response information notifying that the personal information stored in the storage device is appropriate is received, the response information being transmitted from the user terminal in response to receipt of the appropriateness/inappropriateness confirmation information.

According to the information management system of the fourth item, appropriateness/inappropriateness of the personal information stored in the storage device can be determined, based on a result of confirmation performed by the user in person.

(Fifth item) The information management system set forth in any one of the first to fourth items, wherein the personal information appropriateness/inappropriateness determination section determines that the personal information stored in the storage device is appropriate when a time period that has passed since the personal information was stored into the storage device is equal to or shorter than a predetermined time period.

According to the information management system of the fifth item, when the time period that has passed since the personal information was stored into the storage device is short, it can be determined that the personal information stored in the storage device is newest and appropriate.

(Sixth item) The information management system set forth in any one of the first to fifth items, further including an access permission history management section that manages, by using a blockchain, a history of access enabled by the personal information access management section, the access being of the requesting entity to the personal information stored in the storage device.

According to the information management system of the sixth item, the history of enabled access of the requesting entity to the personal information is managed by using the blockchain, whereby it can be made easy to handle unauthorized access to the personal information.

(Seventh item) An information management method performed by an information management system that manages encrypted personal information on a user stored in a storage device, including: a personal information appropriateness/inappropriateness determination step of determining whether or not the personal information stored in the storage device is appropriate when access permission information is received from a user terminal used by the user, the access permission information instructing that a requesting entity requesting the personal information be permitted to access the personal information; and a personal information access management step of enabling the requesting entity to access the personal information stored in the storage device when it is determined in the personal information appropriateness/inappropriateness determination step that the personal information stored in the storage device is appropriate.

The configuration of the information management system of the first item can be implemented by executing the information management method of the seventh item in the information management system.

REFERENCE SIGNS LIST

1 . . . information management system, 10 . . . CPU, 11 . . . user registration section, 12 . . . personal information appropriateness/inappropriateness determination section, 13 . . . personal information access management section, 14 . . . decryption key usage management section, 15 . . . access permission history management section, 30 . . . storage device, 31 . . . control program, 32 . . . user DB, 33 . . . enterprise DB, 50 . . . user terminal, 90 . . . enterprise management system, 100, 110, 120 . . . other information management system, U . . . user.

What is claimed is:

1. An information management system that manages encrypted personal information on a user stored in a memory, comprising a CPU wherein the CPU:
   when access permission information is received from a user terminal used by the user, the access permission information instructing that a requesting entity requesting the personal information be permitted to access the personal information, determines that the personal information stored in the memory is appropriate if an elapsed time from a time when the personal information is stored in the memory is within a predetermined time, and transmits, to the user terminal, appropriateness/inappropriateness confirmation information inquiring about appropriateness or inappropriateness of the personal information stored in the memory if the elapsed time from the time when the personal information is stored in the memory is longer than the predetermined time to determine whether or not the personal information stored in the memory is appropriate; and
   enables the requesting entity to access the personal information stored in the memory when it is determined that the personal information stored in the memory is appropriate.

2. The information management system according to claim 1, wherein the CPU enables the requesting entity to access the personal information stored in the memory, by transmitting a decryption key for decrypting the encrypted personal information to a requesting entity terminal used by the requesting entity.

3. The information management system according to claim 2, wherein the CPU issues a token for using the decryption key and manages, by using a blockchain, the number of usages of the decryption key through the token.

4. The information management system according to claim 1, wherein the CPU determines that the personal information stored in the memory is appropriate when response information notifying that the personal information stored in the memory is appropriate is received, the response information being transmitted from the user terminal in response to receipt of the appropriateness/inappropriateness confirmation information.

5. The information management system according to claim 1, wherein the CPU manages, by using a blockchain, a history of access enabled, the access being of the requesting entity to the personal information stored in the memory.

6. An information management method performed by a CPU included in an information management system that manages encrypted personal information on a user stored in a memory, comprising:
   a personal information appropriateness/inappropriateness determination step of, when access permission information is received from a user terminal used by the user, the access permission information instructing that a requesting entity requesting the personal information be permitted to access the personal information, determining that the personal information stored in the memory is appropriate if an elapsed time from a time when the personal information is stored in the memory is within a predetermined time, and transmitting, to the user terminal, appropriateness/inappropriateness confirmation information inquiring about appropriateness or inappropriateness of the personal information stored in the memory if the elapsed time from the time when the personal information is stored in the memory is longer than the predetermined time to determine whether or not the personal information stored in the memory is appropriate; and
   a personal information access management step of enabling the requesting entity to access the personal information stored in the memory when it is determined in the personal information appropriateness/inappropriateness determination step that the personal information stored in the memory is appropriate.

* * * * *